Feb. 6, 1940.   H. J. GRAHAM   2,189,603
CONTROL SYSTEM
Filed Oct. 3, 1935
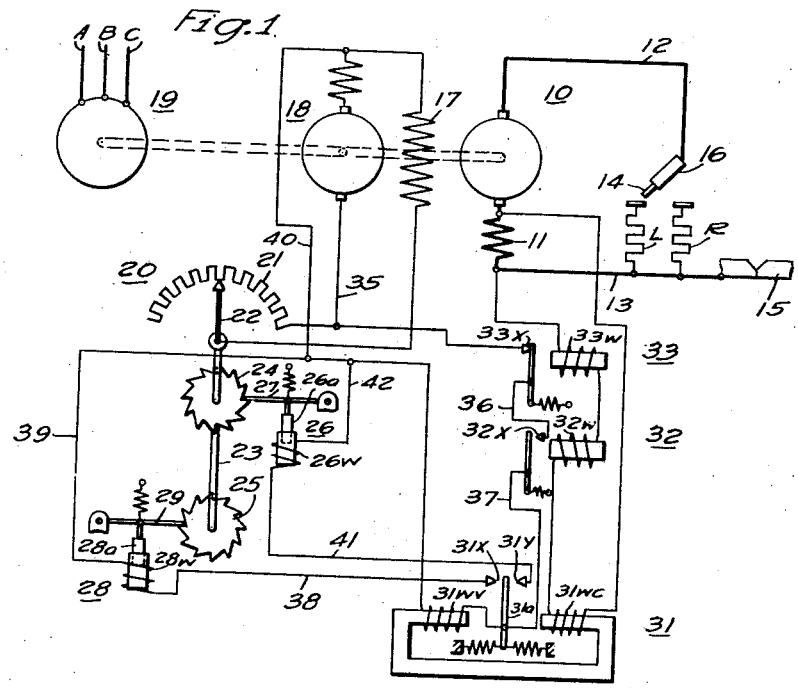
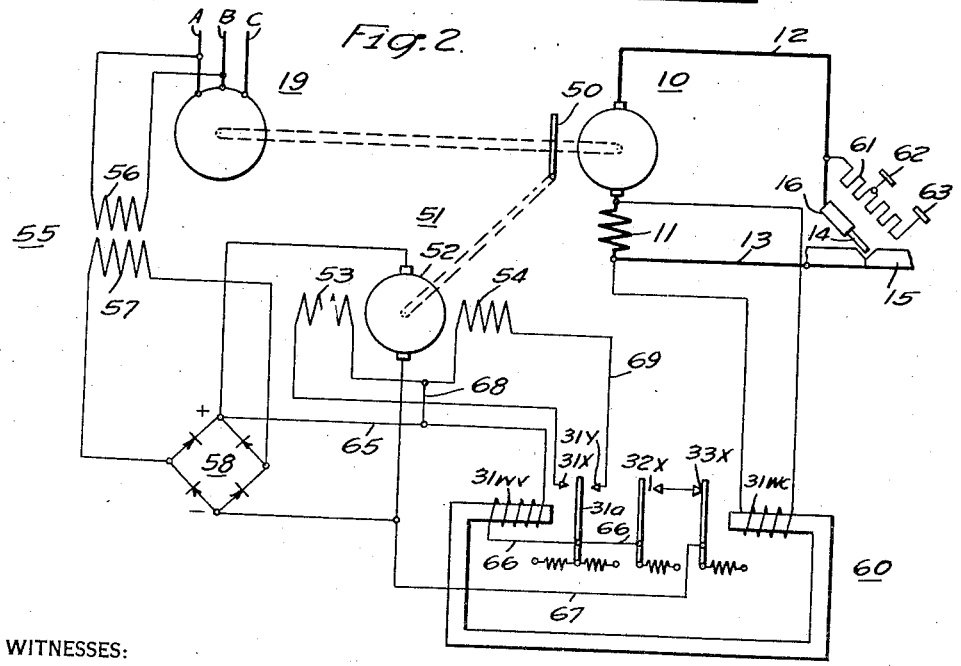
WITNESSES:
E. A. McCloskey
R. R. Lockwood
INVENTOR
Harold J. Graham.
BY
J. M. Crawford
ATTORNEY Patented Feb. 6, 1940

2,189,603

UNITED STATES PATENT OFFICE 2,189,603

CONTROL SYSTEM

Harold J. Graham, Boston, Mass., assignor to Westinghouse Electric & Manufacturing Company, East Pittsburgh, Pa., a corporation of Pennsylvania Application October 3, 1935, Serial No. 43,358

4 Claims. (Cl. 171—229)

My invention relates generally to control systems and it has particular relation to systems for remotely controlling the output capacity of a direct-current generator.

An object of my invention, generally stated, is to provide a system for remotely controlling the output capacity of a direct-current generator which shall be simple and efficient in operation and which may be readily and economically manufactured and installed.

The principal object of my invention is to provide for changing, from a remote position, the output capacity of an electric generator.

An important object of my invention is to provide for utilizing the flow of current in the load circuit of a generator for effecting changes in the output of the generator.

Another important object of my invention is to provide for utilizing the flow of a low value of current in the load circuit of a generator for effecting changes in its output capacity and for utilizing the normal flow of current for preventing the operation of the mechanism effecting the changes.

Another object of my invention is to provide for utilizing different values of current flow in the load circuit of a generator for selectively operating a control mechanism to either increase or decrease the output capacity of the generator.

Still another object of my invention is to provide for utilizing different values of current flow in the load circuit of a generator for selectively operating a control mechanism to either increase or decrease the output capacity of the generator and for utilizing the normal flow of current in the load circuit for preventing the operation of the control mechanism.

Other objects of my invention will in part be obvious and in part appear hereinafter.

My invention, accordingly, is disclosed in the embodiment hereof shown in the accompanying drawing and comprises the features of the construction, combination of elements and arrangement of parts which will be exemplified in the constructions hereinafter set forth and the scope of the application of which will be indicated in the appended claims.

For a more complete understanding of the nature and scope of my invention, reference may be had to the following detailed description taken in connection with the accompanying drawing, in which Figure 1 illustrates diagrammatically a concrete embodiment of my invention, and Fig. 2 illustrates diagrammatically a modification of my invention.

In order to remotely control the output capacity of a direct-current generator, such as a welding generator, I have provided a mechanism which is responsive to different values or current flowing in the load circuit of the generator to effect changes in the output capacity of the generator. For example, the generator may be provided with a main field winding which is connected to a source of excitation through a field rheostat. A mechanism is provided for operating the field rheostat in either direction in order to either increase or decrease the current flowing through the main field winding. In order to selectively control this mechanism, a current responsive relay system is provided. This current responsive relay system is connected to the load circuit. For example, it may be connected across the differential series field winding of the generator to be responsive to the flow of current in the load circuit.

At the point where the load circuit is connected to the load, for example to the welding arc, one or more resistors may be provided which may be selectively connected to permit different predetermined values of current to flow through the load circuit. Depending upon which of the resistors is connected across the load circuit, an operation will be effected at the generator to either increase or decrease its output capacity.

Referring now specifically to Fig. 1 of the drawing, the reference character 10 designates generally a direct-current generator having a differential series field winding 11 which may be connected, as illustrated, to energize a load circuit represented by the conductors 12 and 13. The conductors 12 and 13 may terminate, respectively, in a welding electrode 14 and work 15, on which a welding operation may be performed by means of an arc maintained between the welding electrode 14 and the work 15 in the customary and well known manner. The electrode 14 may be carried by a suitable electrode holder 16.

The generator 10 may be provided with a main field winding 17 which is connected for energization to an exciter-generator, shown generally at 18, of the series type. In order to drive the generator 10 and the exciter generator 18, an alternating current motor 19 may be provided, as illustrated, and connected to a suitable source of alternating current by means of conductors A, B, C.

The current flow through the main field winding 17 may be controlled by means of a field rheostat, shown generally at 20, having a resistor 21 connected in series circuit relation between the exciter-generator 18 and the main field winding 17. A movable arm 22 is provided for varying the effective resistance of the resistor 21 connected in the circuit. As shown, the arm 22 is mounted on a shaft 23 on which are also mounted ratchet wheels 24 and 25.

The ratchet wheel 24 may be operated by means of an electro-magnet shown generally at 26, having an armature 26a connected to operate a pawl 27 which, as shown, is arranged to engage the ratchet wheel 24. The electromagnet 26 is also provided with an operating winding 26w, which may be connected for energization across the terminals of the exciter-generator 18 in a manner which will be set forth hereinafter. In like manner, the ratchet wheel 25 may be operated in an opposite direction by means of an electromagnet, shown generally at 28, having an armature 28a connected to a pawl 29 and an operating winding 28w which may also be energized from the exciter-generator 18.

The electromagnets 26 and 28 may be selectively controlled by means of a main control relay shown generally at 31. This relay is provided with contact members 31x and 31y which are connected respectively to the operating windings 28w and 26w. An armature 31a is arranged to engage either of the contact members 31x or 31y, depending upon whether the flux generated by the current operating winding 31wc is greater or less than the flux generated by a voltage operating winding 31wv. Normally, the armature 31a is held out of contact with either of the contact members 31x or 31y by means of the centering springs, as illustrated. It will be understood that the armature 31a is composed of magnetic material and that the proper polarities will be induced therein by the leakage flux from the magnetic circuit of relay 31 on energization of windings 31wv and 31wc.

The main control relay 31 is, in turn, controlled by means of an auxiliary control relay, shown generally at 32. This relay is provided with contact members 32x and an operating winding 32w.

In order to prevent the functioning of the control system while the load circuit is carrying normal current, a cut-off relay, shown generally at 33, is provided having contact members 33x which are normally closed, and an operating winding 33w. On the flow of normal current in the load circuit, the operating winding 33w is sufficiently energized to open contact members 33x; otherwise they remain in the closed condition in order to permit the effecting of the different control functions.

The control mechanism is selectively operated by means of resistors L and R which may be mounted in any suitable container and carried by the welding operator. The resistor L may be arranged to permit the flow of 10 amperes of current in the load circuit and when such current flows, the rheostat 20 is operated in such a direction as to decrease the flow of exciting current in the main field winding 17, and, therefore, to lower the output capacity of the generator 10. In like manner, the resistor R may be of such value as to permit the flow of current in the load circuit, as for example 25 amperes, which will be sufficient to operate the rheostat 20 in a reverse direction to increase the flow of exciting current in the main field winding 17 and, therefore, to increase the output capacity of the generator 10.

In describing the operation of the system, it will be assumed that the motor 19 is energized and is operating the generator 10 and the exciter-generator 18 at the proper speed. It will further be assumed that the welding electrode 14 is out of engagement with either of the resistors L or R and also out of engagement with the work 15. Under these conditions, the various relays and operating mechanisms will be in the positions illustrated in the drawing.

Assuming that the operator wishes to lower the output capacity of the generator 10, he will cause the welding electrode 14 to engage one terminal of the resistor L, the other terminal of which is connected, as illustrated, to the load conductor 13. Current will then be caused to flow through the load circuit at a value corresponding to the resistance of the resistor L which may be taken, as set forth, to be 10 amperes. It will be observed that the operating windings 31wc, 32w and 33w are connected in series circuit relation and across the differential series field winding 11. Thus the flow of 10 amperes in the load circuit will cause a flow of current through these operating windings proportionate to this value of current flowing through the differential series field winding 11. While the system has been illustrated as being connected across the differential series field winding, it will be obvious that any other suitable connections may be provided which will cause the operating windings 31wc, 32w and 33w to be responsive to the flow of current in the load circuit.

The cut-off relay 33 is so adjusted that its contact members 33x will remain in the closed condition, except when normal current, for example 50 amperes or above, is caused to flow in the load circuit. Contact members 32x, however, are immediately closed on the flow of the minimum value of control current, and, therefore, an energizing circuit is completed, not only for the operating winding 31wv of the main control relay 31 but also for one or the other of the operating windings 26w or 28w depending upon the position of the armature 31a.

Since the minimum value of control current is caused to flow through the load circuit on flow of current through resistor L, the flux generated by the operating winding 31wc will be less than the flux generated by the operating winding 31wv. As a result, the armature 31a will be attracted to engage contact members 31x and the operating winding 28w will be energized to operate the field rheostat 20 in such a direction as to increase the resistance in series circuit relation with the main field winding 17 and consequently decrease the output capacity of the generator 10.

The circuit for energizing the operating winding 28w may be traced from one terminal of the exciter-generator 18 through conductor 35, contact members 33x, conductor 36, contact members 32x, conductor 37, armature 31a, contact member 31x, conductor 38, operating winding 28w and conductors 39 and 40 to the other terminal of the exciter-generator 18. It will be observed that the operating winding 31wv is connected in parallel circuit relation with the operating winding 28w.

As soon as the operator moves the welding electrode 14 from the upper terminal of the resistor L, the operating winding 32w will be deenergized and contact members 32x will be opened. The previously described control circuit will, therefore, be opened and the operating windings 28w and 31wv will be deenergized. By repeatedly opening and closing the circuit through the resistor L, it is possible to successively effect the operation of the field rheostat 20 in steps to increase the resistance connected in series circuit relation with the main field winding 17.

When it is desired to raise the output capacity of the generator 10 by decreasing the resistance connected in series circuit relation with the main field winding 17, the operator may cause the welding electrode 14 to engage the upper terminal of the resistor R, the other terminal of which is connected to the conductor 13. The current now caused to flow through the load circuit is considerably increased over that which previously flowed when the resistor L was connected and may be, for example, 25 amperes, as mentioned hereinbefore.

Since the cut-off relay 33 is arranged to operate its contact members only on the flow of a larger value of current, for example 50 amperes, its contact members will still remain closed on flow of the larger control current. The flow of the larger control current causes a greater flow of current in the operating winding 31wc and this is so adjusted as to generate a flux which is greater than the flux generated by the operating winding 31wv. As a result, the armature 31a is attracted to engage the contact members 31y and, therefore, the operating winding 26w of the electromagnet 26 is energized.

The circuit for energizing the operating winding 26w may be traced from one terminal of the exciter-generator 18 through conductor 35, contact members 33x, conductor 36, contact members 32x, conductor 37, armature 31a, contact member 31y, conductor 41, operating winding 26w, conductors 42 and 40 to the other terminal of the exciter-generator 18.

By repeatedly making and breaking the load circuit through the resistor R, it is possible to successively operate the electro-magnet 26 to move the armature 22 in such a direction as to decrease the effective resistance connected in series circuit relation with the main field winding 17.

After the rheostat 20 has been properly adjusted by the operator to provide the setting required to supply the desired amount of load current, he may begin the welding operation. This will be accomplished in the usual manner by causing the electrode 14 to engage the work 15 to draw the welding arc. Under normal operating conditions, the flow of current in the load circuit will be relatively high as compared to the flow of current in the resistors L or R. This flow of current is enough to sufficiently energize the operating winding 33w of the cut-off relay 33, so that contact members 33x are opened. The energizing circuits for the electro-magnets 26 and 28 are thereby opened and no operation thereof can take place while normal current is flowing in the load circuit. As soon as load current ceases to flow, contact members 33x are closed and the control circuit is conditioned for completion at contact members 32x and 31x or 31y, depending upon whether the resistor L or the resistor R is engaged by the electrode 14.

Referring now particularly to Fig. 2 of the drawing, it will be observed that certain modifications of the circuit connections illustrated in Fig. 1 are there shown. In this modification of the invention, a generator 10 is provided having a series field winding 11 as set forth hereinbefore. However, this generator may be of the type shown in Patent No. 1,979,665 issued November 6, 1934, to J. H. Blankenbuehler, and assigned to the assignee of this application. The generator 10 is arranged to supply current to a load circuit comprising the conductors 12 and 13, which terminate, respectively, in an electrode 14 and work 15 on which the welding operation is to be performed. As described hereinbefore, the electrode 14 may be held by means of an electrode holder 16.

The output capacity of the generator 10 may be varied, as set forth in the aforementioned patent, by employing a magnetic shunt 50. The position of the magnetic shunt 50 may be controlled by means of a reversible control motor, shown generally at 51. The motor 51 is provided with an armature 52. In order to operate the motor 51 in opposite directions, separate field windings 53 and 54 are provided, which may be oppositely energized. It will be understood, however, that any other suitable type of reversible motor may be employed and that the motor 51, shown herein, is used merely for illustrative purposes.

The armature 52 of the motor 51 may be energized by direct current which is obtained through a transformer, shown generally at 55, having a primary winding 56 connected between conductors A and B of the three-phase supply line which is connected to energize the motor 19 which may be provided for driving the generator 10. The transformer 55 is also provided with a secondary winding 57 that is connected to a rectifier, shown generally at 58, which is preferably of the dry or copper-oxide type. The armature 52 is connected, as illustrated, across the direct-current terminals of the rectifier 58. It will be understood that the motor 51 is provided in lieu of the electro-magnetic means which is provided in Fig. 1 for effecting the operation of the rheostat 20. It will also be understood that the motor 51 may be employed instead of the electro-magnetic means for operating this rheostat.

As will be readily apparent, the functions of the cut-off relay 33 and the auxiliary control relay 32 may be combined in the operation of the main control relay 31. This combination is shown in the control relay illustrated generally at 60 in Fig. 2. In order to more clearly describe the functioning of the main control relay 60, as including the functions of the cut-off relay 33 and the auxiliary control relay 32, the same reference characters have been applied to the contact members of the main control relay 60 that are applied to the cut-off relay 33, the auxiliary control relay 32 and the main control relay 31. In addition, the same reference characters have been applied to the operating windings of the main control relay 60 as are applied to the operating windings of the main control relay 31. In order to more clearly set forth the circuit connections, the armature 31a and the armatures for contact members 32x and 33x have been shown as being in the plane including the magnetic circuit for the relay 60. It will be understood, however, that they may be positioned in a plane at right angles to their present location in order to secure more suitable operating conditions.

In the operation of the main control relay 60 the armature 31a is caused to engage either contact member 31x or 31y, depending upon whether the flux generated by the operating winding 31wv is greater or less than the flux generated by the operating winding 31wc. Contact members 32x are so arranged that they will be closed regard- less of whether or not the flux generated by the operating winding 31wv is greater than the flux generated by the operating winding 31wc. It will be readily understood that this operation may be effected since the operating winding 31wc is first energized and it is necessary to close contact members 32x before operating winding 31wv is energized. Contact members 32x, therefore, are magnetically sealed closed and with a proper design of the magnetic circuit of the main control relay 60, they will not be reopened, even though the flux generated by the operating winding 31wv is greater than the flux generated by the operating winding 31wc under certain operating conditions. Contact members 33x are so adjusted as to be opened only when normal current flows through the load circuit of the generator 10.

In order to selectively control the functioning of the main control relay 60 a resistor 61 is provided, which takes the place of the two resistors L and R, shown in Fig. 1 of the drawing. The resistor 61 may be incorporated in the handle of the electrode holder 16, so that a compact device requiring a minimum of parts may be carried by the operator. The resistor 61 is provided with taps 62 and 63, which may take the form of buttons or the like, protruding through the handle of the electrode holder 16. In order to effect the functioning of the main control relay 60 the operator may contact either tap 62 or 63 with the work 15, depending upon the direction in which he wishes to operate the motor 15.

In operation, assuming that the operator wishes to energize the control motor 51 in a direction corresponding to the energization of the field winding 54, he will cause tap 62 to engage the work 15. The greater value of control current will then flow through the load circuit and through the series field winding 11. The operating winding 31wc will, therefore, be energized and contact members 32x will be closed. A circuit will then be completed for energizing operating winding 31wv.

The circuit for energizing the operating winding 31wv may be traced from the positive terminal of the rectifier 58 through conductor 65, operating winding 31wv, conductor 66, contact members 32x, contact members 33x and conductor 67 to the negative terminal of the rectifier 58.

Since the flux generated by the operating winding 31wc under these conditions is greater than the flux generated by the operating winding 31 wv, the armature 31a is caused to engage contact member 31y and field winding 54 is energized.

The circuit for energizing the field winding 54 may be traced from the positive terminal of the rectifier 58, through conductors 65 and 68, field winding 54, conductor 69, contact member 31y, armature 31a, conductor 66, contact members 32x, contact members 33x and conductor 67 to the negative terminal of the rectifier 58.

As long as the operator causes the tap 62 to remain in contact engagement with the work 15, the contact member 31y will be engaged by the armature 31a and the motor 51 will be continuously operated. As soon as the tap 62 is removed from engagement with the work 15, armature 31a is released and the motor 51 no longer operates.

If the operator wishes to effect the operation of the motor 51 in a reverse direction, he may cause the tap 63 to engage the work 15. A smaller control current will then flow through the load circuit than flowed therethrough when the tap 62 was in engagement with the work 15, due to the fact that a larger portion of the resistor 61 is connected across the load circuit. As a result, as soon as contact members 32x are closed and operating winding 31wv is energized, the armature 31a is caused to engage contact member 31x. It will be understood that this operation takes place since the flux generated by the operating winding 31wv under these conditions is greater than the flux generated by the operating winding 31wc. As a result, the field winding 53 is energized in a manner similar to the energization of the field winding 54 and the motor 51 operates in a reverse direction. The motor 51 will continue to operate in this direction as long as the operator holds the tap 63 in engagement with the work 15. As soon, however, as it is moved out of engagement with the work 15, the armature 31a is released and the field winding 53 is deenergized. The motor 51 then ceases to operate to move the magnetic shunt 50.

As soon as the desired setting of the magnetic shunt 50 is obtained, the operator may begin the welding operation by causing the electrode 14 to engage the work 15. A current then flows through the load circuit which is considerably greater than the current which flows therethrough when either of the taps 62 or 63 of the resistor 61 is caused to engage the work 15. This current is sufficient to cause the contact members 33x to be opened and, therefore, during normal operation of the system, neither of the field windings 53 or 54 can be energized.

Since certain further changes may be made in the foregoing constructions and different embodiments of the invention may be made without departing from the scope thereof, it is intended that all matter set forth in the foregoing description or shown in the accompanying drawing shall be considered as illustrative and not in a limiting sense.

I claim as my invention:

1. A remote control system for an electric generator connected to supply current to a load circuit comprising, a source of substantially constant voltage, electro-responsive means for varying the output of the generator, a pair of resistors disposed to be selectively connected across the load circuit to produce the flow of control currents of different values therein, and means including a differential control relay having opposed operating coils one of which is connected to be energized in accordance with the voltage of the source and the other connected to be energized in accordance with the said control currents for selectively controlling the energization and operation of the output varying means of the generator in response to the flow of said control currents therein.

2. A remote control system comprising, in combination, an electric generator, means for varying the output of the generator, a source of substantially constant voltage, electro-responsive means for actuating said output varying means, energizing circuits for said electro-responsive means, a differential control relay having opposed operating coils one of which is connected to be responsive to the voltage of said source and the other to be responsive to the flow of control currents of different predetermined values in the load circuit of the generator for partially completing the said energizing circuits for the electro-responsive means, resistor means disposed to be selectively connected in the load circuit of the generator to selectively effect the flow therein of said control currents of different predetermined values, and an auxiliary control relay connected to be responsive to the flow of either one of the control currents in the load circuit for finally completing the energizing circuit for the electro-responsive means which has been partially completed by the differential control relay.

3. A remote control system for an electric generator connected to supply current to a load circuit comprising, in combination, electro-responsive means for effecting either an increase or a decrease in the output of the generator, a source of substantially constant voltage, a pair of resistors disposed to be selectively connected across the load circuit to produce the flow therein of two different values of control current of less magnitude than the normal load current flowing therein, energizing circuits connecting said electro-responsive means with the said voltage source, a differential relay having first and second opposed operating windings for selectively controlling the energization of said energizing circuits, said first operating windings being connected for energization in accordance with the flow of said control currents in the load circuit and said second operating windings being responsive to the voltage of said source, and an auxiliary control relay having normally open contact members connected in circuit relation with the said second operating winding and the energizing circuits for the electro-responsive means and responsive to the flow of either of said control currents in the load circuit for rendering the differential relay effective to control the operation of the electro-responsive means.

4. A remote control system for an electric generator connected to supply current to a load circuit comprising, electro-responsive means for varying the output of the generator, a source of substantially constant excitation voltage for the generator, a pair of resistors disposed to be selectively connected across the load circuit to produce the flow therethrough of different values of control current less than the normal load current of the generator, a differential control relay having opposed operating coils one of which is connected to be responsive to the voltage of said source and the other of which is connected to be responsive to said control currents for controlling the operation of the electro-responsive output varying means, an auxiliary control relay operable in response to the flow of said control currents in the load circuit to render the differential control relay effective to perform control operations, and a cut-off relay operable in response to flow of a current in the load circuit greater than the control currents for rendering the differential control relay ineffective to control the output varying means of the generator thereby to preclude variation in the output thereof under normal load conditions.

HAROLD J. GRAHAM.